June 8, 1971 A. J. SARKA Re. 27,139

METHOD AND APPARATUS FOR FEEDING WEBS AT CYCLICALLY VARIABLE SPEEDS

Original Filed March 6, 1967 2 Sheets-Sheet 1

INVENTOR
ALBERT J. SARKA
BY Young, Raney, Flynn and Taralli
ATTORNEYS

June 8, 1971 A. J. SARKA Re. 27,139
METHOD AND APPARATUS FOR FEEDING WEBS AT CYCLICALLY VARIABLE SPEEDS
Original Filed March 6, 1967 2 Sheets-Sheet 2
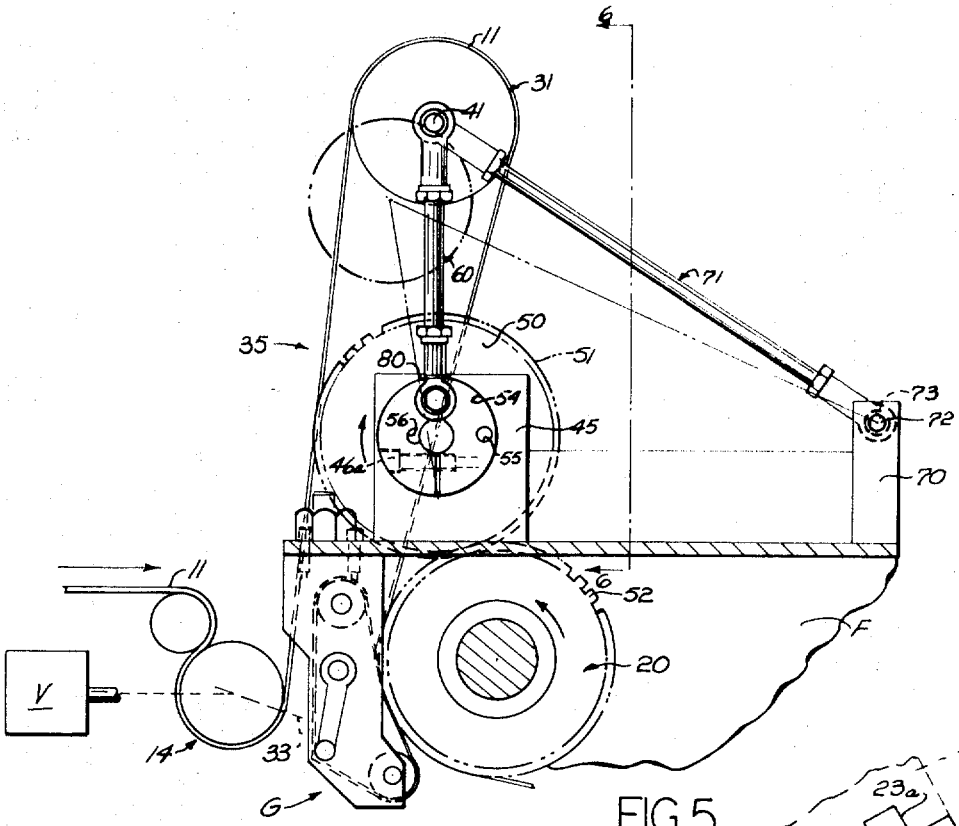
FIG.5
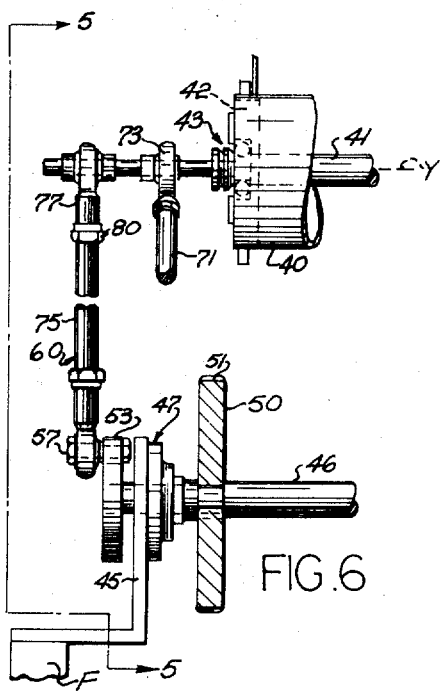
FIG.6
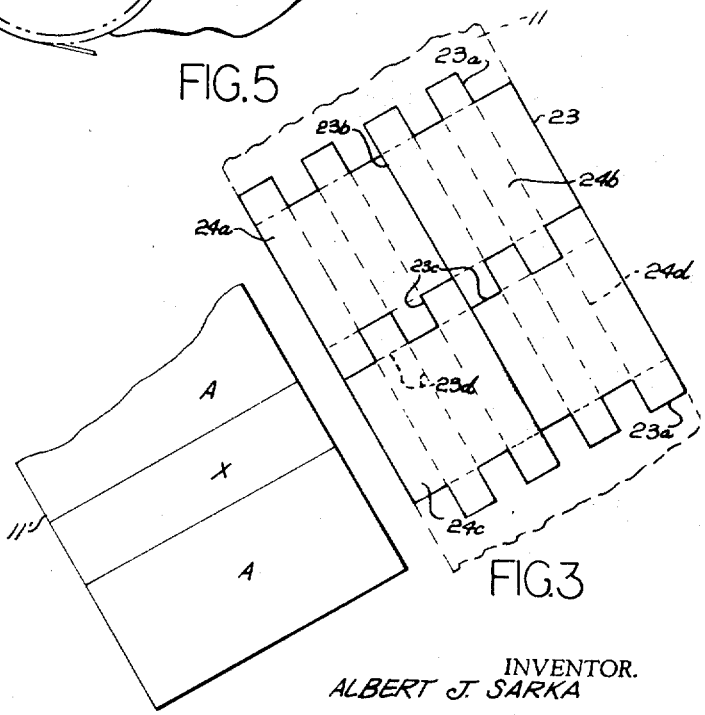
FIG.3
FIG.4
INVENTOR.
ALBERT J. SARKA
BY
Young, Rangy, Flynn and Torello
ATTORNEYS United States Patent Office Re. 27,139
Reissued June 8, 1971

27,139

METHOD AND APPARATUS FOR FEEDING WEBS AT CYCLICALLY VARIABLE SPEEDS

Albert J. Sarka, Fairview Park, Ohio, assignor to Harris-Intertype Corporation, Cleveland, Ohio Original No. 3,379,351, dated Apr. 23, 1968, Ser. No. 620,697, Mar. 6, 1967, which is a continuation-in-part of Ser. No. 438,552, Mar. 10, 1965. Application for reissue Apr. 20, 1970, Ser. No. 30,368
Int. Cl. B23d *25/02*
U.S. Cl. 83—38 20 Claims

Matter enclosed in heavy brackets [ ] appears in the original patent but forms no part of this reissue specification; matter printed in italics indicates the additions made by reissue.

ABSTRACT OF THE DISCLOSURE

Three cooperating rotatable cylinders form a pair of nips. Cutting and/or creasing elements on the cylinders engage the material at the nips and work on the material. A material advancing means feeds material to the cylinders at a constant speed, and a roll intermediate the advancing means and the first nip is shifted to change the speed of the material relative to rotation of the cylinders and slows the speed of the material advancing through the nips when no work is being performed thereon at the work stations. Changing of the advancing speed is effected due to the roll increasing the distance that the material moves from the advancing means to the first nip.

This application is a continuation-in-part of copending application Ser. No. 438,552, filed Mar. 10, 1965, now U.S. Patent No. 3,347,119, and assigned to the assignee of the present application.

The present invention relates to a method and apparatus for working on material and, more particularly, to a method and apparatus wherein sheet-like material in web form is advanced toward working elements and the feed of the material to be worked on is varied so that the material properly registers with the working elements.

A principal object of the present invention is the provision of a new and improved method and apparatus for working on material as it is advanced through successive work stations and which provide for a high speed operation and minimum of material waste and a variance in the work performed on the material at the work stations.

Another object of the present invention is the provision of a new and improved method and apparatus wherein cooperating cylinders work on material advanced through the cylinder nip and wherein a member which engages the material moves to control the size of a loop of material located in advance of the nip and specifically moves to increase the size of the loop when no work is being done on the material in the nip and thus retards the advancing movement of the material sufficiently to effect registration of the material with the cylinders when work is to be performed on the material.

Another object of the present invention is the provision of a new and improved method and apparatus for working on material wherein the material is fed at a constant speed to a work station at which working elements engage the material and move the material at a speed greater than the feeding speed and wherein a loop of material is provided between the work station and the feeding means which is changed in size to slow the speed of the material advancing toward the work station when work is not being performed to permit registry of a particular location on the material with the work station.

A further object of the present invention is the provision of a new and improved method and apparatus wherein a change in the speed of advance of the material and the amount of change in size of the loop may be varied in accordance with the length of material being worked on at the work stations.

Still another object of the present invention is the provision of a new and improved material handling apparatus for working on sheet-like material in web form in which different operations are performed at successive work stations and on alternate portions of the web material by material engaging elements cooperating at each station to work the material, and wherein the apparatus includes an advancing means for feeding the material at a constant speed toward a first work station, and means intermediate the material advancing means and the first work station for changing the length of the path traveled by the material between the material advancing means and the first work station so as to slow the speed of material passing through the work station and properly register portions of the material with work engaging elements at the work stations.

Yet another object of the present invention is the provision of a new and improved material handling apparatus, as set forth in the next preceding paragraph, wherein the means between the advancing means and the first work station comprise a roll which is moved in a manner to increase and decrease the length of the path traveled by the material between the advancing means and the first work station, and which roll is moved in accordance with movement of the work engaging means.

A still further object of the present invention is the provision of a new and improved material handling apparatus of the type described wherein the work engaging elements are carried by rotating cooperating cylinders which form nips therebetween through which the material is advanced and wherein the roll is connected to the cylinders for lateral shifting movement to slow the speed of material feeding through the apparatus in accordance with the angular position of the work engaging elements on the cylinders.

Other objects and advantages of the present invention will become apparent from a consideration of the following detailed description thereof made in reference to the accompanying drawings which form a part of the specification and wherein:

FIG. 3 is a fragmentary view of material which has een worked on by the apparatus of FIG. 1;

FIG. 4 is a schematic fragmentary view of material /orked on by the apparatus of FIG. 2;

FIG. 5 is a fragmentary sectional view of the material ıandling apparatus embodying the invention, taken approximately at line 5—5 of FIG. 6; and FIG. 6 is a fragmentary elevational view taken approximately at line 6—6 of FIG. 5.

Figures 1A, 1B, 1C, 1D:
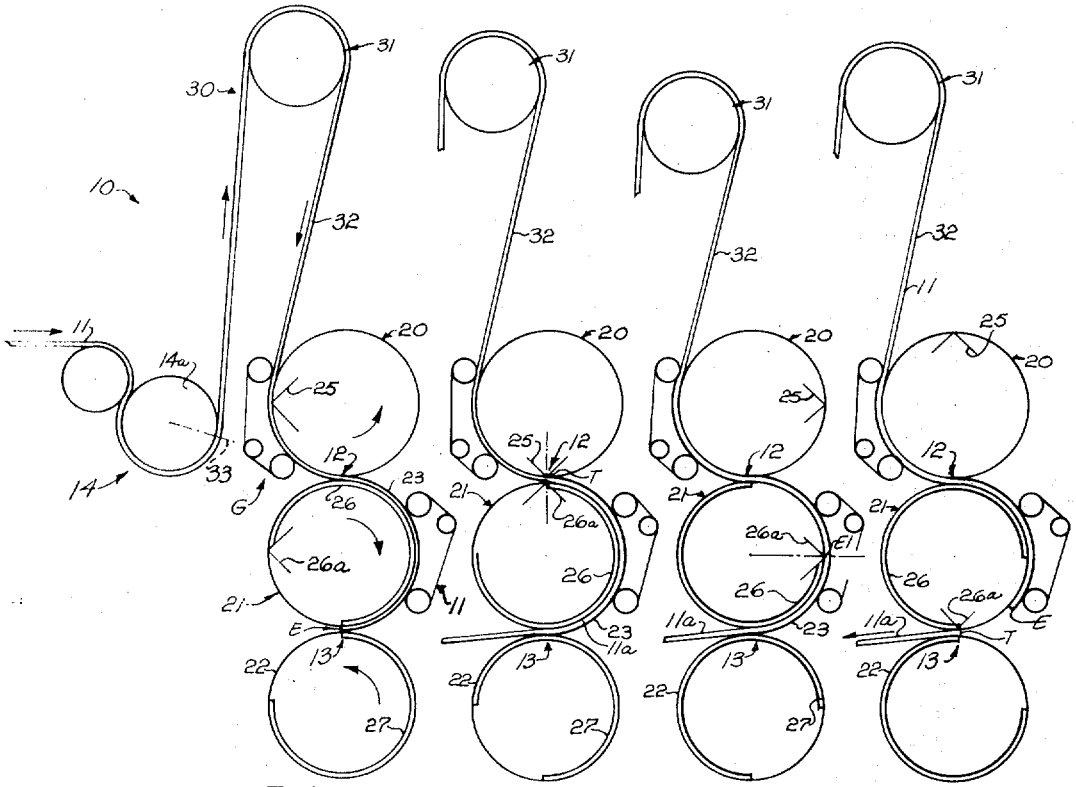
FIGS. 1A to 1D are schematic views showing operative positions of a material handling apparatus embodying the present invention.

The present invention provides a method and apparatus /herein sheet-like material in web form is worked on as t is advanced through successive work stations which ıerform separate working operations on the material, and /hich are capable of performing many different types of /ork operations on the material; for example, printing coring, cutting, embossing, etc.

The preferred embodiment of the present invention omprises a material handling apparatus 10 which perorms blanking or cutting and creasing of web material 1. The apparatus 10 includes two work stations 12, 13 at /hich the material 11 is worked on as it is advanced hrough the apparatus and material advancing of feed neans 14, which may be driven from a primary drive notor of the apparatus, for feeding the web material at a ubstantially constant speed toward the work stations 2, 13.

The apparatus 10 of FIG. 1 is of the rotary type with he work stations 12, 13, defined by nips of cylinders 0–22, which are rotatably supported in a tangential relaionship by side frames F of the apparatus (shown in ıart in FIG. 5) to provide the afore-mentioned nips. In he illustrated embodiment the cylinders 20–22 are vertiıally disposed, with the upper cylinder 20 and internediate cylinder 21 positioned to define the work station 2 therebetween, and with the work station 13 being lefined by the nip between the intermediate cylinder 21 ınd the lower cylinder 22. The cylinders 20–22 are of he same diameter and are driven in common by a suitably ıonstructed drive mechanism at the same rotational speed o that the peripheries of the cylinders have identical surace speeds. The drive for the cylinders is conventional ınd has, therefore, not been illustrated; however, such a lrive preferably includes gears on the cylinders in mesh vith each other so as to drive the upper and intermediate ıylinders in opposite directions of rotational and with the ntermediate and lower cylinders being driven in opıosite directions of rotation, as is well known.

The cylinders 20–22 carry cooperating work engaging ılements upon their peripheries which move on rotation ıf the cylinders to engage and work the web material noving through the work stations. It is apparent from FIGS. 1A to 1D that the web material 11 advances downvardly along the periphery of the cylinder 20, through he work station 12 from left to right, as viewed in the lrawings, around the periphery of the cylinder 21 and hrough the work station 13 from right to left, as viewed n the drawings.

The web material is guided along the peripheries of the ıylinders by any suitable means, such as cylinder tape ıssemblies which maintain the material closely adjacent he cylinder and direct the material through the work tations. A tape assembly G cooperates with the cylinder 0 and a similar tape assembly H cooperates with the ıylinder 21. These assemblies guide the material around he respective cylinder and hold the material thereagainst ınd thus effect control of the material and aid in register ıf the material with the cylinder nips.

The apparatus of FIG. 1 produces a plurality of separaıle carton blanks in sheet form in a manner to be decribed in detail presently, and FIG. 3 illustrates one sheet ıf carton blanks so produced. In many instances, the carıon blanks formed by the apparatus are printed, and the /eb material from which the cartons are blanked will carry a plurality of printed images of the cartons to be blanked. As shown in FIG. 3, a sheet 23, which may by printed as mentioned, is cut from the web 11 (shown in broken lines) by transverse cut lines 23a, which extend across the width of the web material to permit separation of the sheet 23 from the adjacent material. The transverse cut lines provide a plurality of projections and indentures on adjacent areas of the material and these projections and indentures are registered with the printed images of the cartons. Each sheet 23 includes four printed carton blanks 24a–24d, arranged in a reverse nested manner and which are separable by a longitudinal cut line 23b extending between the cut lines 23a, and a transverse cut line 23c between the cut lines 23a. The blanks 24a–24d may also include suitable creases 23d (shown by broken lines) to facilitate folding of the blanks into finished cartons. It should be apparent from the foregoing that the cut lines 23b, 23c, and the crease lines 23d are registered with the printed carton blank images on the sheet 23. It is to be understood that the carton blanks 24a–24d, as shown, are merely illustrative of the type of work which can be performed by the apparatus of FIG. 1 and in practice, blanks of a much more complex nature are often produced.

In the embodiment illustrated in FIG. 1, the cylinder 20 carries die means 25 which cooperates with die means 26 on the intermediate cylinder 21 so that when the cylinders are driven, the die means 25, 26 engage the material at the work station 12 during an angular extent of rotation of the cylinders determined by the construction of the die means. The die means 25 comprises a cutting element which cooperates with a cutting element 26a which forms part of the die means 26 to transversely sever the material 11 at spaced locations. The cutting elements of the die means may be of any suitable construction which provides a desired configuration of the severing cut through the material 11 and in the illustrated embodiment the cutting elements are constructed to produce the cut line 23a illustrated in FIG. 3.

The lower cylinder 22 carries die means 27 which engages the material 11 and works on the material at the work station 13 in conjunction with the die means 26 on the cylinder 21 to perform an operation on the material subsequent to the cutting operation performed at the work station 12. The die means 26, 27 of FIG. 1 cooperate to produce the cut lines 23b, 23c and the crease lines 23d of the sheet 23.

The die means carried by the cylinders 20–22 may be of any suitable construction but in the preferred embodiment the die means 25, 26, 27 are in the form of plate members which extend around a portion of the periphery of the cylinders and with each plate member secured to the periphery of its respective cylinder, for example, by plate clamps located in suitable gaps, not shown, in the cylinder. The plate members are preferably constructed of thin flexible material and include radially projecting portions in the form of lands, which may be formed by an etching process. Lands on the cooperating plate members are constructed so as to cooperate with each other at the work station between the cylinders to either sever the material passing therethrough, or provide for creasing of the material, depending upon the particular construction of the cooperating lands at the work station. Die means constructed with lands, as described, are in themselves known in the art (see, for example, United States Patent No. 3,185,568, issued to Downie et al.) and further description is, therefore, not necessary.

It is apparent from the drawings that the plate member of the die means 26 on the intermediate cylinder 21 extends approximately 270 degrees about the periphery of that cylinder and that the die means on the lower cylinder 22 similarly extends about 270 degrees around the cylinder, so that during approximately 90 degrees of rotation of the cylinders 21–22, no work can be performed at the work station 13. The afore-mentioned gaps in the cylinders are located in this 90 degree segment. It is also apparent that the cutting element of the die means 25 on the upper cylinder 20 has an extremely small working area and that if the web material 11 were fed through the work stations 12, 13 at a constant speed, an area of the web equal to approximately one-quarter of the surface area of the cylinders could not be worked on and would, in all probability, be wasted.

As illustrated in FIGS. 2A–2D, the apparatus 10 is set up to work on alternate areas of the web 11' and thereby perform two separate jobs on the alternate areas. A portion of a web worked on by the apparatus set according to FIGS. 2A–2D is illustrated in FIG. 4 and includes areas X, worked on at the work station 12' and which are disposed on the web 11' alternately with areas A which are worked on at the work station 13'. The areas A, X of the web 11', illustrated in FIG. 4, carry printed images of cartons to be blanked therefrom and with which die means at the work stations register. The die means 26' on the cylinder 20 includes a working portion which extends approximately 90 degrees around the periphery of that cylinder, and which cooperates with a similarly configured portion 26a' of the die means 26' on the intermediate cylinder 21, which also extends approximately 90 degrees around the periphery of that cylinder. The die means 25' and 26a' work on the areas X of the material 11' to cut and/or crease the material at desired locations thereon.

The die means 26' on the intermediate cylinder 21 extends approximately 270 degrees around the periphery of the intermediate cylinder with the aforementioned 90 degree portions 26a', cooperating with die means on the cylinder 20 and with the remaining 180 degree segment 26b' of the die means 26' cooperating with the die means 27' on the lower cylinder 22 at the work station 13' so as to operate on the areas A of the web. The die means 27' on the cylinder 22 has a working area which extends 180 degrees around the periphery of that cylinder and from FIGS. 2A–2D, it is apparent that if the material 11' were fed through the work stations 12, 13' at a constant speed, an area of the web equal to approximately one-quarter of the surface area of a cylinder would not be worked on and could be wasted, as noted above in reference to FIGS. 1A–1D.

In accordance with the present invention, means 30 are provided between the advancing means 14 and the first work station for changing the length of the path traveled by the web material between the advancing means 14 and the first work station to retard the speed of the material advancing through the first work station. In the illustrated embodiment, the means 30 includes a material engaging member 31 which forms a loop 32 in the web material intermediate the advancing means 14 and the first work station. The member 31 moves toward and away from a line, generally indicated at 33, extending between the axis of rotation of a feed roll 14a of the advancing means 14 and the first work station 12 at the nip between the cylinders 20, 21 to change the size of the loop 32 and, therefore, the length of the path of travel of the web material from the feeder to the first work station. Since the advancing means 14 feeds the material 11 at a constant speed, a change in the length of the path traveled by the material produces a change in speed of the material advancing through the first work station.

The feeder means 14 may be of any suitable construction, as previously mentioned, and is preferably operated to feed the web material toward the first work station at a speed which is lower than the surface speed of the cylinders 20–22. The feeder means 14 is driven from a power source through a variable speed drive schematically indicated in FIG. 5 and designated V. The speed of the feeder means 14 is controlled by the variable speed drive so that it feeds a length of material equivalent to the working area of the dies, such as die 26, during 360 degrees of rotation of the cylinders. If the dies change, as they will from job to job, a proper adjustment in the speed of advance of the material must be made.

The member 31 which controls the loop size is moved by a drive mechanism 35, which will be described in detail presently. The member 31 moves generally toward the line 33 to reduce the size of the loop and permit the material to be moved through the work stations by the die means at the surface speed of the cylinders 20–22. The material engaging member 31 moves generally away from the line 33 after the material is worked on at the first work station 12 and prior to the material being worked on at the second work station 13, to slow the speed of the material relative to the surface speed of the cylinders 20–22 and to effect registry of a particular portion of the material with the die means on the cylinders 21, 22 at the second work station.

Referring again to FIGS. 1A–1D, it will be seen in FIG. 1A that a leading edge E of the material 11 is just entering the work station 13 with the die means 26, 27 on the cylinders 21, 22 engaging the material 11 and beginning to work on the material.

In FIG. 1B, the cylinders 20–22 have rotated through 90 degrees with the material 11 having advanced between the die means 26, 27 of the cylinders 21, 22 and with the cutting element 26a having rotated into engagement with the cutting element of the die means 25 on the cylinder 20 to sever the material moving through the work station 12 along the line 23a to form the sheet 23 having its trailing edge adjacent the cutting element 26a of the die means 26. As the cylinders 21, 22 continue to rotate, the sheet 23 is fed through the station 13 by the die means 26, 27 which advance the sheet 23 at the speed of the peripheries of these cylinders and blanking of the sheet is effected as it is advanced therethrough. It is apparent in FIG. 1B that during the 90 degree rotation of the cylinders 20–22 between their positions shown in FIG. 1A and those shown in FIG. 1B, the material engaging member 31 has moved downwardly toward the line 33 to permit reduction of the size of the loop 32, and the feeding of the material 11 through the work stations 12, 13 at the speed of the peripheries of these cylinders, which speed is greater than the speed at which the material is being fed by the advancing means 14.

The material engaging member 31 continues its downward movement as the cylinders 20–22 rotate to their positions shown in FIG. 1C and the die means 26, 27 continue to work on the sheet 23, while the cutting elements 26a, 25 have moved out of registry so that no work is being performed upon the material 11 at the work station 12. Due to the downward movement of the material engaging member 31, the trailing edge T of the sheet 23 continues to move at the speed of the leading edge E1 of a subsequent sheet portion during the 90 degree rotation of the cylinders 20, 21 following the cutting operation at the work station 12.

After a further 90 degree rotation of the cylinders 20–22, the apparatus 10 is in its position illustrated in FIG. 1D with the material engaging member 31 moving upwardly away from the line 33, and thereby increasing the size of the loop and slowing the speed of the material being fed to the work station 12. Since no work is being performed on the material at the station 12, the material is free to move relative to the surfaces of the cylinders 20, 21 and as the size of the loop 32 is increased by the lateral shifting of the material engaging member 31, the speed of the material 11 advancing through the work station 12 is slowed relative to the speed of the surfaces of the cylinders 20–21 to effect separation of the trailing edge T of the sheet 23, and the leading edge E1 of the subsequent sheet portion of the web material 11. It is clear that the sheet 23 continues to be advanced through the work station 13 by the die means 26, 27 at a speed corresponding to the peripheral speed of the cylinders during novement of the cylinders from their positions shown in FIG. 1C to their positions shown in FIG. 1D. The slowing of the material 11 separates the leading edge E1 of the subsequent sheet portion from the trailing edge T of the sheet 23 by about 45 degrees around the periphery of the cylinder 21.

A further 90 degree rotation of the cylinders 20–22 returns the cylinders to their positions illustrated in FIG. 1A, and which movement is accompanied by a further upward movement of the material engaging member 31 to its position illustrated in FIG. 1A wherein the size of the loop 32 is increased to its maximum size to result in alignment of the leading edge E1 of the subsequent sheet with the leading edges of the die means 26, 27 at the work station 13, so that the leading edge E1 of the subsequent sheet portion is moved to the position designated in FIG. 1A. It is apparent that as a result of the movement of the material engaging member 31 during a cycle of operation of the apparatus 10, the leading edge E1 of the subsequent sheet portion is slowed by the means 30 so that its position relative to the die means 26 of the cylinder 21 is shifted approximately 90 degrees. The leading edge E1 is thus aligned with the leading portions of the die means 26, 27 at the work station 13, thereby permitting formation of the subsequent sheet portion with minimum waste of material occurring during the cycle, yet with the advancing means 14 operating to advance the material 11 toward the apparatus 10 at a constant speed. It will also be apparent that when the material 11 is printed prior to blanking, operation of the member 31 provides proper alignment of the die means with the images.

Figures 2A, 2B, 2C, 2D:
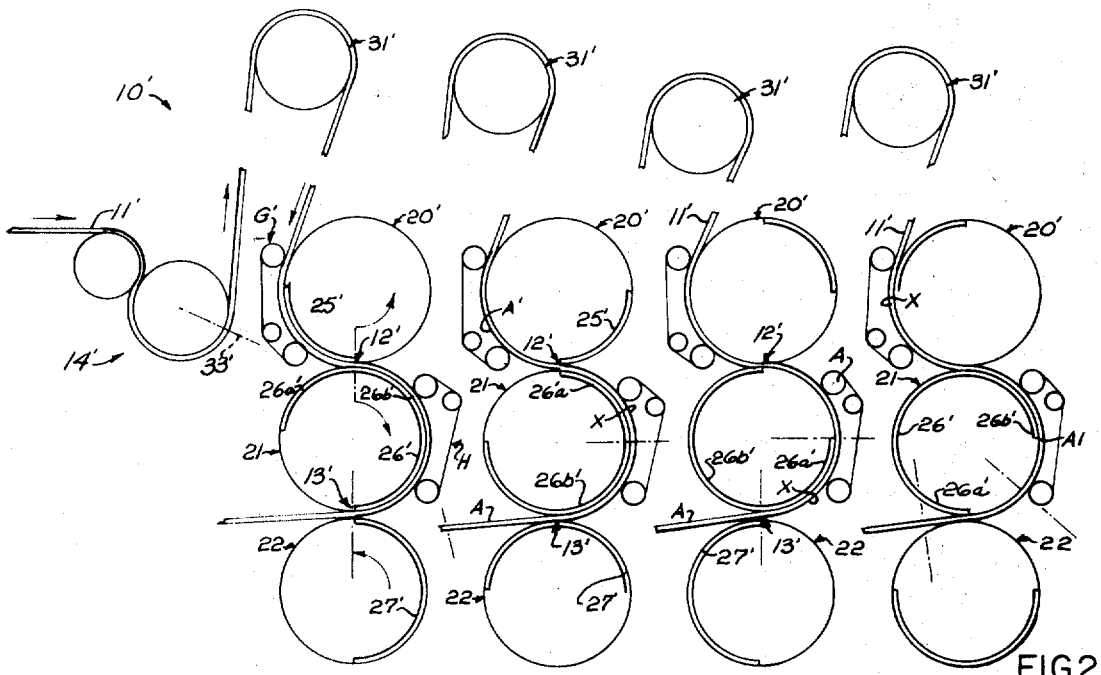
FIGS. 2A to 2D are schematic views showing operative positions of the apparatus of FIG. 1 which has been modied to perform different work on the material from that hown in FIG. 1.

When the apparatus 10 is set up to perform separate work functions on the alternate areas of the web 11, as illustrated in FIGS. 2A–2D, the means 30 operates to permit the material to be worked on at closely adjacent areas on the material and with images printed thereon aligned with the die means 25'–27'. As shown in FIG. 2A, the cylinders 20–22 are in position wherein the die means 25' and 26a' are just beginning to work on an area X of the material station 12', while the die means 26b' 27' are beginning to work on an area A at the work station 13. The material engaging member 31 is in its uppermost-position to provide a loop 32 of maximum size.

As illustrated in FIG. 2B, the cylinders 20–22 have rotated 90 degrees from their position illustrated in FIG. 2A, with the die means 25', 26a' having completed blanking of the area X of the material 11, while the die means 27', 26b' continue to work on the area A, additionally, the member 31 has moved downwardly toward the line 33 from its position shown in FIG. 2A decreasing the size of the loop 32 to permit advancing of the material 11 through the work stations 12', 13' by the die means 26b, 27' at the speed of the peripheries of the cylinders 20–22, and faster than the speed at which the material is fed by the advancing means 14, as previously noted.

As the cylinders 20–22 rotate to their positions shown in FIG. 2C, the die means 27', 26b' complete working on the area A of the material 11, and when the cylinders are in their illustrated position, no work is being performed at either of the work stations 12', 13' and the blanked area X of the material 11 is beginning to advance through the work station 13'. As illustrated in FIG. 2C, the material engaging member 31 is in its lowermost position relative to the cylinder 20–22 so that the loop 32 of the material 11 is of minimum size due to the material 11 having been fed through the stations 12', 13' at the peripheral speed of the cylinders. With the cylinders positioned as illustrated, the leading edge of an area A1, following the area X of the material 11, is positioned at the trailing edge of the portion 26a' of the die means 26' on the cylinder 21.

As the cylinders rotate 90 degrees from their positions illustrated in FIG. 2C to their positions illustrated in FIG. 2D, the material engaging member 31 moves upwardly away from the line 33 to slow the advance of the material 11 through the apparatus 10 and thereby retard the speed of movement of the material 11 relative to the peripheries of the cylinders 20–22. As a result of the slowing of the material 11, the leading edge of the area A1 moves relative to the die means 26' on the cylinder 21 and is shifted approximately 45 degrees relative to the trailing edge of the portion 26a' of the die means 26'. Thus, the leading edge of the portion 26b' of the die means 26' has started to "catch up" to the leading edge of the area A1.

As the cylinders 20–22 continue to rotate through another 90° to their position shown in FIG. 2A, the material-engaging member 31 continues to move away from the line 33 to maintain the speed of the material 11 at a lower speed than the peripheral speed of the cylinders 20–22 so that when the cylinders are again in their positions illustrated in FIG. 2A, the leading edge of the portions 26b' of the die means 26' has "caught up" with the leading edge of the area A1 at the work station 13' and with the area A1 and the die means 26', 27' properly registered at the working station.

From the foregoing, it is apparent that the feed means 14 feeds material toward the first work station at a constant speed which is lower than the peripheral speed of the cylinders 20–22 and that the member 31 increases the size of the loop 32 to slow the speed of the material fed to the work station 12 to a speed which is lower than its feeding speed. The member 31 reduces the size of the loop 32 to permit advancing of the material through the work station 12 at a speed which is greater than its feeding speed.

It is further apparent that the speed of the advancing means, rotational speeds of the cylinders, and extent of movement of the material-engaging member must be related to permit working on the material at desired locations and for the desired length. For example, at a given speed of operation of the cylinders, the speed of the advancing means and the extent of movement of the material-engaging member 31 are related to permit operation of the apparatus on particular areas of the material 11. If the die means were replaced by substantially differently configured die means to perform different operations on the material, the speed of the feeder means 14 and extent of movement of the material-engaging member 31 can be adjusted to compensate for the change in size of the replacement die means. One skilled in the art could determine the desired feeding speed and extent of movement of the material-engaging member on the basis of the operating speed of the cylinders and the size of the die means connected thereto.

In the preferred embodiment of the invention, the material-engaging member 31 is a freely rotatable roll, which is illustrated in FIGS. 5 and 6 along with the drive mechanism 35 for effecting the aforementioned movement thereof. The roll 31 includes a hollow cylindrical member 40 which is rotatably supported by a shaft 41 by means of annular end plates 42 (only one of which is shown in FIG. 6). The end plates 42 are fixed to the cylinder member 40 at their outer peripheries and are supported for rotation relative to the shaft 41 by bearing means, generally indicated at 43. By this construction, the cylinder member 40 is free to rotate about an axis Y of the shaft 41 in response to frictional engagement with the material 11 at its outer periphery.

The shaft 41 is supported for lateral shifting movement relative to the side frames F of the apparatus 10 (only one of which is shown in FIG. 5) by the drive means 35. The frame members F include fixed bearing support members 45 which extend upwardly and which rotatably support a crankshaft 46 adjacent its ends in bearing assemblies of conventional construction, only one of which is illustrated at 47. The crankshaft 46 carries a gear member 50 which is suitably fixed thereto and which includes teeth 51 in mesh with teeth 52 of a drive gear for the cylinder 20 so that as the cylinder 20 rotates in a counterclockwise direction, as viewed in FIG. 5, the gear member 50 rotates clockwise to drive the crankshaft 46.

Crank members 53 (only one of which is illustrated are supported at each end of the crankshaft 46 and are maintained fixed by clamping means 46a against rotation with respect to the crackshaft 46. The cranks 53 are generally disc-like members having aperatures 54, 55, 56 therein which are formed at differing radial distances from the axis of rotation of the crank 53 and with the apertures 54 receiving crank pins 57 in the form of bolts extending through the apertures 54 and secured to the crank by suitable nuts.

Connecting rods 60 extend between the crank pins 57 and the shaft 41 of the roll 31 to effect the aforementioned lateral shifting of the axis Y of the shaft 41 in response to rotation of the crankshaft 46. Each connecting rod 60 includes suitable rod end bearings at its ends which permit relative rotation between the ends of the rod 60 and the crank arm 57 and shaft 41, respectively.

Each of the frame members F additionally includes a bearing support member 70 which extends upwardly therefrom and pivotally supports a connecting rod 71 which is connected between a pivot pin 72 and the shaft 41. The connecting rod 71 carries rod end bearings, generally indicated at 73, so that the shaft 41 and pivot pin 72 are rotatable relative to the end of the connecting rod 71. The connecting rods 71 support the roll 31 for movement by the connecting rods 60 from its position shown in full lines in FIG. 5, to its position shown in broken lines in FIG. 5, wth the axis Y of the shaft 41 being shifted about the axis of the pivot pins 72.

As has been noted previously, the die means on the cylinders 20–22 are removable and are changed from job to job. Because areas of carton blanks vary according to the type and size of carton to be produced, the areas of die means used to blank the web material vary accordingly. The speed of drive rolls 14 can be controlled to feed the proper length of material, and the web is, in effect, held back or retarded for the length of the non-working area of the cylinders. From the foregoing description, it should be apparent that the amount of shifting of the axis Y of the shaft 41 will govern the amount of relative movement between a point on the web material and the surfaces of the cylinder 20–22, since the shifting of the roll 31 determines the difference in size of the loop 32 between the advancing means 14 at the first work station. For this reason, the crank pins 57 may be secured in the apertures 55 or 56, as well as the aperture 54, to provide for adjustment of the throw of the roll 31.

If the crank pins 57 are fixed in the apertures 56, the throw of the roll is relatively small and shorter than the throw of the roll illustrated in FIG. 5; while fixing the crank pins 57 in the apertures 55 provides a relatively larger throw of the roll than the throw illustrated in FIG. 5. It is apparent that any number of apertures may be provided in the crank 53 to provide for a greater number of adjustments of the throw of the roll, and that other linkages between the connecting rods 60 and the cranks 53 could be utilized to permit adjusting the throw of the roll. It should be noted that, if desired, the throw of the roll 31 can be adjusted to increase the size of the loop 32 at a rate sufficient to maintain the web stationary at the work stations for a limited time, or even to move the web in a reverse direction.

In addition to the adjustment for the throw of the roll 31, the length of the connecting rods 60, 71 can be adjusted to change the position of the roll 31 relative to the line 33 at any given crank angle. As best seen in FIG. 6, each connecting rod 60 includes a rod member 75 having its opposite ends threadedly received in rod end portions 76, 77 associated with a crank pin 57 and the shaft 41, respectively. Thus, by rotating the rod 75 about its longitudinal axis, the threads in the ends thereof are advanced relative to the rod end portions 76, 77 to change the length of the connecting rod 60. When the desired length of the connecting rod 60 has been obtained, the rod portion 75 is fixed relative to the end portions 76, 77 by tightening suitable locking nuts 80 which are supported on the threads of the rod member. The connecting rod 71 is constructed in substantially the same manner as the connecting rod 60 and the length of the rod 71 is adjustable in the same manner as set forth above in reference to the connecting rod 60. The adjustments of the length of throw and the length of the connecting rods provide for an infinite adjustment of the web loop size.

While a single embodiment of the present invention has been illustrated and described herein in considerable detail, the invention is not to be considered to be limited to the precise construction shown. A material handling apparatus constructed in accordance with the invention could, for example, comprise a single work station through which the web is advanced. Moreover, the material-engaging member could take other forms than that described herein. It is my intention to cover hereby all adaptation, modifications, and uses of the present invention which come within the scope of the appended claims.

Having described my invention, I claim:

1. Apparatus for forming material into a plurality of portions including one portion of a first predetermined length and another portion of a second predetermined length, said apparatus comprising first and second rotatable cylinders having a nip therebetween which comprises a work station, material advancing means for continuously feeding material through said work station, die means carried by said cylinders and cooperating to work on said one portion of material at said work station, said cylinders including nonworking areas on their respective peripheries, and means for forming a loop in the material in advance of said work station, said means including a member engageable with said material and means for moving said member in a first direction to provide for a decrease in the size of said loop while said first predetermined length of material passes through said work station and said one portion of material is being worked on at said work station by said die means, and for moving said member in a second direction to provide for an increase in the size of said loop to retard the speed of movement of material while said second predetermined length of material passes through said work station and said other portion of material is adjacent to said non-working areas of said cylinders.

2. A material handling apparatus as defined in claim 1 wherein said material advancing means operates at a speed lower than the surface speed of said cylinder and feeds a length of material equal to said predetermined length for 360° of rotation of said cylinders.

3. A material handling apparatus as defined in claim 2 further including means for varying the speed of operation of said advancing means to compensate for changes in said predetermined length.

4. A material handling apparatus as defined in claim 1 wherein said means for moving said member comprises a drive mechanism operatively connected with said cylinders to effect movement of said member in timed relation to rotation of said cylinders.

5. A material handling apparatus as defined in claim 4 wherein said drive mechanism includes means providing for adjustment of the amount of change in size of said loop to vary the reduction in speed of the material.

6. An apparatus for working on material comprising first and second rotatable members having a nip therebetween for forming a work station through which material advances, means on said rotatable members for engaging the material and working on the material at said work station during a predetermined angular extent of movement of said members, advancing means for continuously advancing material through said work station, and means intermediate said advancing means and said work station for slowing the advancing speed of the material passing through the work station when said means on said rotatable members are not working on the material, said means including a material-engaging member and means for moving said member to effect a change in the speed of the material advancing through said work station in accordance with the rotation of the rotatable members.

7. An apparatus as defined in claim 6 wherein said advancing means is operative to advance the material toward said rotatable members at a speed which is less than the surface speed of said rotatable members.

8. An apparatus for working on sheet material as defined in claim 7 wherein said material-engaging member is positioned to form a loop of said material between said advancing means and said work station and upon movement thereof effects an increase or a decrease in the size of said loop to thereby change the speed at which material is advanced through said work station.

9. An apparatus as defined in claim 6 wherein said material-engaging member comprises a roll member rotatable about an axis and having a periphery engagable with said material, and means for shifting said axis to change the size of said loop including a connecting rod member having a first end cyclically movable in response to rotation of said rotatable members and a second end supporting said roll member.

10. An apparatus as defined in claim 9 wherein said first end of said connecting rod member is connected with a crank member and said means for shifting said roll member further includes a drive mechanism connected between a drive for said rotatable members and said crank members for driving said crank member in timed relation to rotation of said rotatable members.

11. An apparatus as defined in claim 10 wherein said first end of said connecting rod is connectable to said crank member at a plurality of positions spaced radially apart from an axis of rotation of said crank member to vary the throw of said roll member.

12. An apparatus as defined in claim 9 wherein said connecting rod member comprises first and second parts relatively movable to change the length of said rod member.

13. An apparatus for performing separate work operations on alternate locations of a length of material comprising a first work station having first work-engaging means movable to engage first spaced locations of the material and operable on the material at said first locations as the material is advanced through the first work station, a second work station spaced from said first work station and having second work-engaging means movable to engage second spaced locations of the material which are intermediate said first locations and operable to work on the material at said second locations as the material is advanced through said second work station, advancing means for advancing said material toward said first work station and located in advance of the first work station so that said first work station is located intermediate said second work station and said advancing means, and means intermediate said advancing means and said first work station for slowing the advancing speed of the material when no work is being performed at either work station, said means including a material-engaging member forming a loop in the material in advance of the first work station and means for moving said material-engaging member to provide for a decrease in the size of said loop when work is being performed at said stations and to increase the size of the loop when no work is being performed at said work stations to retard the speed of the material and effect registration of said work-engaging means with said alternate locations of the material.

14. A material handling apparatus as defined in claim 13 wherein said material advancing means operates at a speed lower than the surface speed of said cylinders and feeds a length of material equal to the combined length of the material locations worked at said first and second stations.

15. A material handling apparatus as defined in claim 14 further including means for varying the speed of operation of said advancing means to compensate for changes in said combined length.

16. A method of working on closely spaced locations on sheet material advancing through a work station formed by a nip between adjacent rotatable members having peripheral surfaces including working and non-working areas, said method comprising the steps of feeding the material toward said work station at a constant feeding speed, providing a loop of said material in advance of the work station, working the material at said work station while advancing material through said work station at a working speed greater than said feeding speed, decreasing the size of said loop while working said material due to said working speed being in excess of said feeding speed, increasing the size of said loop when work is not being performed on the material advancing through the work station to reduce the advancing speed of the material, and advancing the material through said working station at said reduced speed which is less than said feeding speed when work is not being performed on the material to effect registration of the material with said working areas.

17. A method as defined in claim 16 wherein said loop is formed by a material-engaging member and further including the step of cyclically shifting the material-engaging member to increase and decrease the size of said loop in timed relation to rotation of the rotatable members.

18. A method of working on closely spaced locations on sheet material advancing through first and second work stations formed by nips between adjacent rotatable members having peripheral surfaces including working and non-working areas, said method comprising the steps of feeding the material toward said first work station at a constant feeding speed, providing a loop of said material in advance of said first work station, working the material at said first work station while advancing the material through said first work station at a working speed greater than said feeding speed, decreasing the size of said loop while working said material due to said working speed being in excess of said feeding speed, working on a location of the material at said second work station which is spaced from said first work station, and increasing the size of said loop when work is not being performed on the material at their said first or second work stations to reduce the advancing speed of the material to a speed which is less than the feeding speed of effect registration of the material with said working areas.

*19. An apparatus for cutting successive articles from a web of material having successive images of articles printed thereon comprising a pair of rotatable cylinders defining a nip therebetween, said cylinders including working and nonworking areas on their respective peripheries, cutting means carried by at least one of said cylinders and defining said working area on said one cylinder, said cutting means being operable to cut the articles from the material as the material advances through the nip, and means for feeding the material into the nip and for registering the printed images of the articles with the cutting means on the cylinders so that the cutting means cuts the articles from the material with the images in registry with the cutting means as the material is advanced through the nip, said means including constant feed means for continuously advancing the material at a constant speed toward the nip and at a speed less than the speed of rotation of the cylinders to feed a given length of material substantially corresponding to the length of said working area during each revolution of said cylinders, a member engageable with a portion of the material which extends between the constant speed feed means and said nip and movable to slow the advance of the portion of the material toward the nip as the nonworking areas move through*

*the nip, and means for moving said member in one direction to effect the slowing of the advance of the portion of the material into the nip.*

*20. An apparatus for cutting successive articles from a web of material as defined in claim 19 wherein both of said cylinders have working means thereon which cooperate to effect cutting of the material, said working means operating to feed material through said nip when said material is being worked upon in said nip, and said means for moving said member effecting movement of said member in a second direction opposite to said one direction to enable said working means on said cylinders to move said material at a speed in excess of the speed of advance of the material by said constant feed means.*

References Cited

The following references, cited by the Examiner, are of record in the patented file of this patent or the original patent.

UNITED STATES PATENTS

| | | | |
|---|---|---|---|
| 1,653,199 | 12/1927 | Belcher | 101—228 |
| 1,978,073 | 10/1934 | Belcher | 101—228 |
| 2,758,541 | 8/1956 | Tison | 226—113 |
| 3,018,027 | 1/1962 | Evers | 226—113 |
| 3,049,078 | 8/1962 | Smith | 101—228 |

ALLEN N. KNOWLES, Primary Examiner

U.S. Cl. X.R.

83—312, 336; 226—113